July 3, 1962 V. P. VANIER 3,041,691
PIPE SUPPORTING APPARATUS FOR CUTTING AND THE LIKE
Filed Feb. 24, 1959 2 Sheets-Sheet 1

INVENTOR
VINCENT P. VANIER
BY
Gardner & Zimmerman
ATTORNEYS

United States Patent Office 3,041,691
Patented July 3, 1962

3,041,691
PIPE SUPPORTING APPARATUS FOR CUTTING
AND THE LIKE
Vincent P. Vanier, 5080 Kearney Ave., Oakland, Calif.
Filed Feb. 24, 1959, Ser. No. 794,889
6 Claims. (Cl. 214—1)

The present invention relates generally to equipment for handling elongated objects such as pipe or the like, and more particularly to equipment for positioning and maintaining pipe in position for performing various operations, such as cutting or grinding thereon.

Although the instant invention is applicable to various types of elongated objects, it is particularly useful in connection with cutting, grinding and similar operations carried out upon pipe or tubing and is described hereinafter in reference to the handling of pipe and operations thereon.

It has been common practice in the past to cut pipe by means such as an acetylene torch. This usually leaves a rough and uneven edge, which, in many instances must be subsequently operated on to provide a smooth and desired end surface as may be required for a particular connection with an individual fitting. Furthermore, the handling and manipulation of long lengths of pipe necessary in such operations has been difficult due to the weight and shape thereof.

The apparatus embodying the present invention overcomes the foregoing difficulties by the provision of means for moving pipe into a desired position, together with means for maintaining same in such position, and performing a variety of functions thereupon in the fixed position. Additionally, the invention rotates the pipe in its longitudinally fixed position so that accomplishment of the desired operations upon the pipe are materially facilitated. Such apparatus broadly includes an operating head adapted to carry a variety of tools or instruments thereon as for cutting, grinding and the like, and this head is pivotally movable in a vertical plane. Additionally, a work or pipe holder is provided including means for conveying work such as pipe into desired relation with the operating head together with means for maintaining the pipe at a desired point while rotating same about its axis for presenting all portions thereof to the tools or instruments.

It is accordingly an object of the present invention to provide work handling apparatus for selectively moving work into a desired position relative to a pivotally mounted tool and rotating same about the axis thereof.

It is a further object of the present invention to provide on a pipe conveyor means controllably raising the pipe and rotating same in a longitudinally fixed position for cutting and like operations thereon.

It is another object of the present invention to provide apparatus of the type described which may be utilized with equal facility either in a shop or on a construction job to rapidly and accurately prepare pipe as may be specified for a particular installation.

It is yet another object of the present invention to provide work holding apparatus of the character described which positively and firmly maintains pipe properly positioned so that abrasive cutting means may be easily and effectively utilized for the cutting of such pipe.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

The invention is illustrated in the accompanying drawings, wherein:

FIGURE 3 is a partial horizontal section view taken at 3—3 of FIGURE 1.

Figure 1:
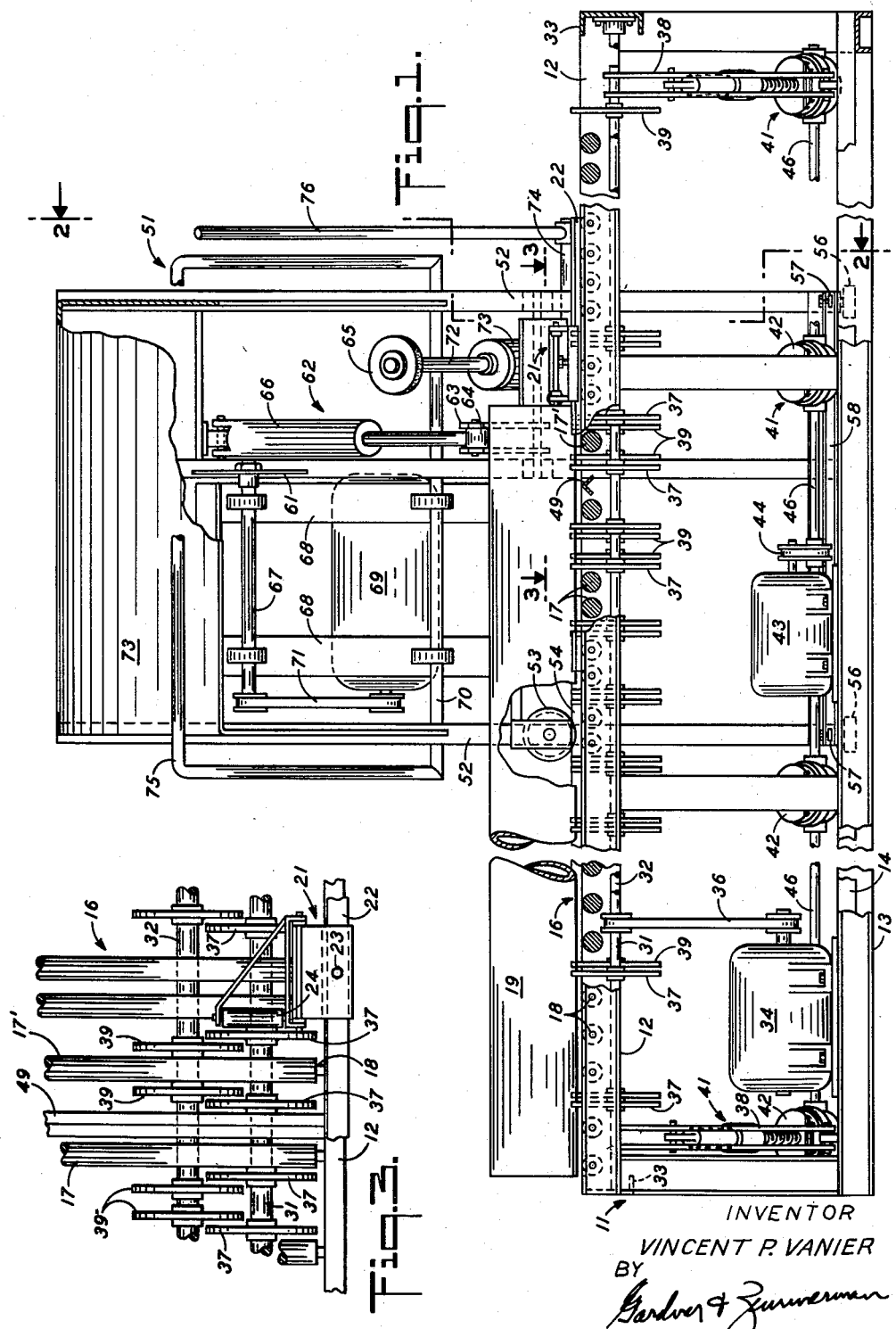
FIGURE 1 is a front elevational view of the pipe handling apparatus embodying the present invention, and having portions of the framework broken away to more clearly illustrate the operational features thereof.

Considering now the illustrated embodiment of the invention in some detail and referring to the drawings there will be seen to be provided a rigid base unit 11 formed, for example, of angle iron or the like and defining a three dimensional rectangle including a pair of top rails 12 and a pair of bottom rails 13. Suitable connecting members are also included in the base unit for structural rigidity as well as a lower longitudinal member 14 for mounting elements identified below. A conveyor bed 16 is formed along the top of the base unit 11 including a plurality of parallel rollers 17 mounted in a horizontal plane transversely of the unit between the top rails 12 thereof. These rollers 17 each include a shaft 18 extending into each of the top rails 12 and rotatable roller mounting may be accomplished by rotatable mounting of the shaft in the rails or rotatable mounting of the rollers upon the roller shafts that are in turn fixed to the rails. It will be appreciated that with the upper surface of the base unit formed of freely rotatable rollers, a pipe 19 or the like placed upon same may be readily moved longitudinally of the base merely by manually pushing the pipe.

Provision is made for aligning the pipe at any desired position longitudinally of the base. To this end a movable stop 21 is slidably mounted upon a track 22 secured longitudinally atop the front top rail 12. A set screw 23 through the stop 21 may be tightened against the track to fix the stop on the track at any desired point along the length thereof. A stop arm 24 is pivotally secured to the stop for movement in a vertical plane between a horizontal stop position across the base unit top and a retracted position rotated upwards in excess of ninety degrees therefrom. The stop arm 24 is thus manually pivotable between these two stable positions wherein it either blocks the conveyor to stop a pipe 19 moving therealong or is entirely removed from the conveyor so as not to interfere with movement of pipe along the conveyor.

Provision is made for raising the pipe 19 from contact with the conveyor 16 and for rotating the pipe in position to facilitate operations thereon. To this end there are provided a pair of parallel shafts 31 and 32 extending longitudinally of the conveyor beneath same with the first shaft 31 adjacent the front edge of the conveyor being mounted for rotation upon end members 33 of the base unit. The first shaft 31 is controllably driven by an electric motor 34 connected to the shaft by a belt 36 and a plurality of discs 37 are mounted upon the first shaft for rotation therewith. These discs 37 extend above the conveyor between rollers thereof and are spaced along the first or rotatable shaft as described below. The second shaft 32 is mounted upon a plurality of pairs of arms 38 which in turn are pivotally mounted upon the lower base member 14. A plurality of discs 39 are rotatably mounted upon this second or pivot shaft 32 for extension above the conveyor between the rollers thereof in the upright position of the pivot arms 38. Means are provided for powered actuation of the pivot arms 38 for raising and lowering the second or pivot shaft 32, and, as shown, each of the drive units 41 includes a worm gear drive 42 pinned to a pair of pivot arms 38 and mounted upon the lower rear base rail 13. A motor 43 is connected as by a belt 44 to a drive shaft 46 which is geared to each of the worm gear drive units 41. These units 41 and shaft pivot arms 38 are spaced along the pivot shaft 32 as shown in FIGURE 1 and suitable controls are provided for operating the motor 43 so that the pivot shaft and discs 39 thereon are controllably movable between retracted position to an extended position with the discs extending in part above the conveyor.

Particular spacing of the drive discs 37 and pivot discs 39 are herein provided for the purpose of maximizing the stability of the pipe during operations thereon. At the ends of the conveyor 16 the discs are provided in pairs, one drive and one pivot disc together between adjacent conveyor rollers 17 and pairs of discs are spaced along the conveyor at sufficiently frequent intervals to provide suitable support to pipe carried by the discs. The central portion of the conveyor is otherwise arranged in that greater than normal spacing is provided between a central conveyor roller 17' and adjacent conveyor members. A pair of pivot discs 39 are disposed with one immediately adjacent each side of the central roller 17' and a pair of drive rollers 37 are disposed with one immediately outward of each pivot disc. Toward the input end of the conveyor from the central roller 17' and adjacent the pair of discs thereat there is provided a rigid inverted V bar 49 in place of the roller that would otherwise occupy this space. Directly adjacent the V bar 49 is another conveyor roller and then a pair of pivot discs with a drive disc on each side thereof. The above described central portion of the conveyor is the area in which operations are performed upon the pipe 19 and particularly advantageous pipe gripping and support is provided by the described structure. It will further be seen that the central portion of the conveyor is especially adapted to provide adequate support for short lengths of pipe to be operated on.

Operations upon pipe or the like are accomplished from a carriage 51 having upright members 52 carrying one or more circumferentially slotted wheels 53 in rotatable relation and setting upon a V track 54 affixed along the upper surface of the top rear base member 12. The upright members 52 extend from the bottom of the base unit well above same and are provided with rollers 56 rotatably depending from the bottoms thereof for rolling along the back side of the rear lower element 13 of the base unit. Also, there are provided small castors 57 rotatably mounted on a vertical axis from an angle bar affixed to the front of the carriage members 52 and engaging in rolling contact an angle iron 58 secured atop the rear lower member 13 of the base unit, this angle iron 58 extending upwards between the castor 57 and carriage member 52. The carriage 51 is thus mounted upon the base unit for motion longitudinally thereof and is prevented from tipping or binding by the aforementioned rotary members.

In addition to the support members of the carriage 51 there is provided as a part thereof a work holding means 62. This means 62 includes a lever arm 63 pivotally secured to a cross member of the carriage and having a freely rotatable roller 64 secured at the free end thereof above the conveyor 16. The lever arm 63 is proportioned so as to dispose the roller 64 thereof substantially vertically above the line of intersection of the drive discs 37 and pivot discs 39 in the raised position of the latter. A hydraulic piston 66 is provided to press the roller 64 downward upon the pipe 19 and this piston 66 is pivotally mounted upon a cross member of the carriage near the top thereof and is pivotally mounted at the other end to the lever arm 63. Suitable control means and power means, not shown, are provided to controllably actuate the hydraulic piston 66 for raising and lowering the lever arm 63.

A plurality of tools suitable for carrying out various desired operations on the pipe may be mounted for pivotal movement on the carriage 51. Such tools may vary in accordance with the operations to be performed, however, as illustrated, an abrasive cutting wheel 61 and a grinding wheel 65 are here employed whereby the pipe may be cut into desired lengths and the ends thereby beveled or otherwise finished by means of the grinding wheel. The cutting wheel 61 is secured to a shaft 67 rotatably mounted on a framework 68 which is pivotally mounted by means of a shaft 70 upon the carriage uprights 52. A motor 69 mounted upon the rear portion of the framework behind the uprights is connected by a belt 71 to the shaft 67 to effect rotation of the abrasive cutting wheel 61. A lever arm 75 fixedly secured at either end of the shaft 70 provides means whereby the wheel 61 may be pivotally moved into or out of cutting engagement with the pipe.

It should be pointed out here that due to the fact that the apparatus of the instant invention provides a stable and positive pipe holding means, an abrasive cutting wheel may be successfully utilized for carrying out pipe cutting operations to the end that pipe may be accurately cut to desired lengths, the edges thereof being smooth so that in many instances further finishing operations on the pipe are unnecessary.

The grinding wheel 65 will be seen to be carried on a power shaft 72 of a motor 73 which is secured to a plate extension of a shaft 74 mounted for pivotal movement on the carriage uprights 52. The wheel 65 is thus disposed at right angles to the longitudinal axis of the pipe so that downward vertical movement of an arm 76 secured to the shaft 74 will bring the grinding wheel into engagement with the edge of the pipe for beveling or similar finishing operations.

Figure 2:
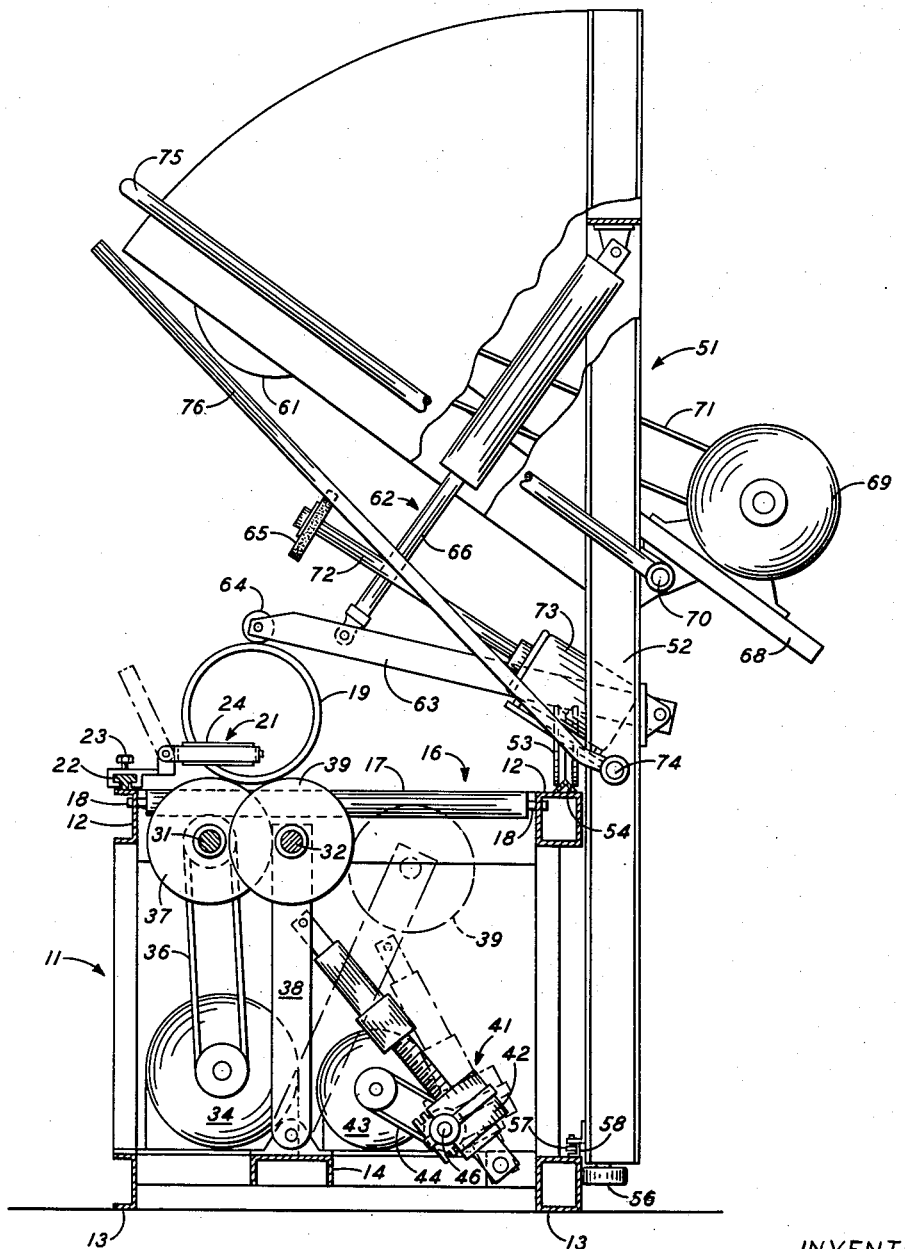
FIGURE 2 is an enlarged transverse sectional view taken at 2—2 of FIGURE 1.

Operation of the present invention is initiated by placing a pipe or the like 19 upon the conveyor 16 and rolling same to a desired position where same is held against further longitudinal movement by the stop 21 with the arm 24 thereof pivoted into stop position across the conveyor. The pivot shaft is then raised from an initial retracted position by manipulation of suitable controls for the motor 43 which powers the drive units 41 to pivot the shaft 32 upwards on the arms 38 so that the pivot discs 39 engage the pipe and raise same against the drive discs 37. This position is shown in FIGURE 2 and the hydraulic piston 66 is then actuated through suitable control means to lower the roller 64 onto the pipe in bearing relation thereto, as shown in FIGURE 1. Energization of the motor 34 then rotates the shaft 31 to turn the drive discs 37 and thereby rotate the pipe 19, with the pivot discs 39 and the top roller 64 freely rotating. With the pipe being rotated numerous operations may be performed thereon by manually lowering suitable tools, such as the abrasive cutting wheel 61 or the grinding wheel 65, with the pipe, the tools being rotated by their associated motors which are suitably energized through control means.

The stop means 21 are movable longitudinally of the conveyor 16, as is the carriage 51, and thus repeated operations upon the pipe are possible at different points therealong by movement of the stop and pipe or by movement of the carriage. Also, with a plurality of tools rotatably mounted on the carriage it is possible to adjust the carriage position to locate any tool or succession of tools in exact relation to the pipe. Rotation of the pipe presents all of the circumferential pipe surface for operation thereon by the tools and thus relatively small tools such as grinders, saws, etc. may be employed to work on the pipe or other work piece.

What is claimed is:

1. Apparatus of the character described comprising conveyor means adapted to support a pipe or the like, a plurality of drive discs extending laterally through said conveyor means and connected for driven rotation about a fixed axis longitudinally of said conveyor, a second plurality of freely rotatable pivot discs mounted for controlled movement through said conveyor means adjacent said drive discs for raising pipe above said conveyor, said pivot discs rotatable about a longitudinal axis movable between a position wherein the tops of the pivot discs are subjacent the tops of the drive discs and laterally spaced therefrom and a position wherein the tops of the pivot discs are aligned with the tops of the drive discs and the pivot discs are in staggered overlapping relation to said drive discs, and pressure means controllably contacting said pipe stop same in rolling contact for fixing said pipe in position.

2. Apparatus as claimed in claim 1 further defined by a pair of parallel shafts with the first thereof connected to drive means for rotating the shaft and carrying said drive discs and said second shaft carrying said second plurality of pivot discs in freely rotatable relation thereto and in offset relation with respect to the drive discs longitudinally of the shaft, a plurality of pivotally mounted arms supporting said second shaft, and powered extension means connected to said arms for controllably pivoting said second shaft into proximity with said first shaft.

3. Apparatus as claimed in claim 1 further defined by said conveyor comprising a plurality of freely rotatable parallel rollers with a central roller having one of said drive discs disposed on each side thereof and one of said second discs between said drive discs and said central roller, and stop means having an arm pivotable between a stop position across said conveyor and a retracted position away from said conveyor.

4. A machine comprising a base having a substantially planar elongated top, a pair of parallel shafts disposed beneath said top longitudinally thereof with the first of said shafts being controllably rotated and carrying a plurality of spaced pipe-supporting drive discs extending partially through said top, a plurality of pivotally mounted arms carrying said second shaft with drive means controllably pivoting said arms between extended and retracted positions wherein the spacing between the shafts is different, a plurality of pipe-supporting pivot discs mounted upon said second shaft in freely rotatable relation thereto and extending partially through said top overlapping said drive discs in extended arm position, said arms moving said pivot discs to and from said drive discs and moving the pivot discs above and below said base top and relative to said drive discs; means pivotally mounted above said top for controlled motion toward and away from same, and a free-rotating roller carried by said last means and positioned to engage the pipe when supported on said drive and pivot discs.

5. Apparatus of the character described comprising conveyor means adapted to support a pipe or the like, a plurality of cylindrical pipe-supporting drive members extending laterally of said conveyor means rotatable about a fixed axis extending longitudinally relative to the conveyor means, a second plurality of freely rotatable cylindrical pipe-supporting members, means supporting said second members for rotation about an axis parallel to said first axis, and operative to move said second members transversely to and from said drive members and vertically relative to the conveyor means for raising the second members thereabove to cooperate with the first members in supporting the pipe for rotation on both sets of said members, and means for moving said supporting means to and holding same in its various positions aforesaid, said first members being in staggered relation to the second members so that the first and second members may be positioned in overlapping relation in cooperating pipe-supporting position.

6. Apparatus of the character described comprising pipe conveyor means, a first set of cylindrical pipe-supporting members mounted for rotation about an axis longitudinally of the conveyor means and having its upper surface above the upper surface of the conveyor means, a second set of rotatable cylindrical pipe-supporting members, means supporting said second members for rotation about an axis parallel to said first members and operative to move said second members to and from and vertically relative to the first members whereby the top of the second members may be raised to a position above said conveyor means to cooperate with the first members in supporting the pipe free of said conveyor means, means for moving the supporting means of the second members to and retaining same in the various positions aforesaid, driving means for rotating one of said sets of members, the other of said sets of members being freely rotatable, and the members of one set being arranged in staggered relation to the members of the other set whereby one set may be moved into overlapping relation with the other set in cooperating pipe-supporting position.

References Cited in the file of this patent
UNITED STATES PATENTS

| | | |
|---|---|---|
| 930,744 | Dunbar | Aug. 10, 1909 |
| 1,783,797 | Klein | Dec. 2, 1930 |
| 1,828,888 | Berry | Oct. 27, 1931 |
| 1,919,186 | Cooper | July 25, 1933 |
| 1,928,811 | Burns | Oct. 3, 1933 |
| 2,487,196 | Sternad | Nov. 8, 1949 |
| 2,575,302 | Shaw | Nov. 13, 1951 |
| 2,600,787 | Lodwick | June 17, 1952 |
| 2,680,607 | Hollinger | June 8, 1954 |
| 2,855,728 | Lindh | Oct. 14, 1958 |

FOREIGN PATENTS

| | | |
|---|---|---|
| 376,254 | Germany | Nov. 9, 1922 |